Feb. 25, 1936. R. D. CROCE 2,031,694
LINING FOR FRUIT BOXES AND THE LIKE
Filed Feb. 26, 1935 2 Sheets-Sheet 2
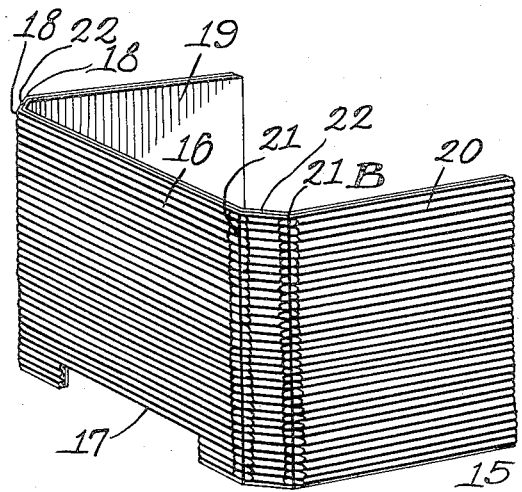
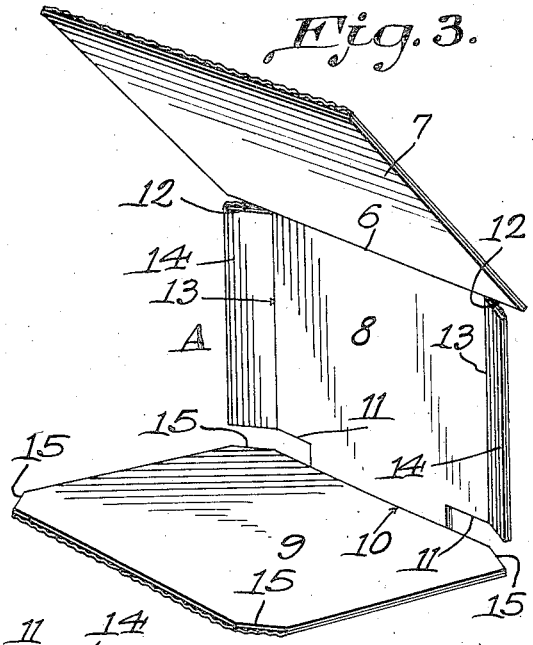
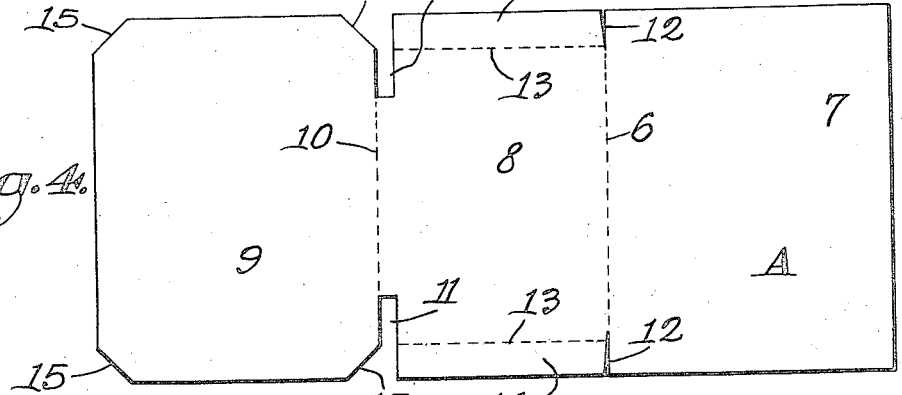
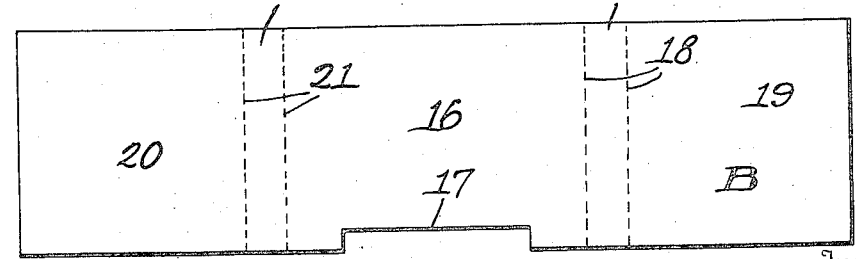
Inventor
Richard D. Croce
By CArrow Co.
Attorneys.

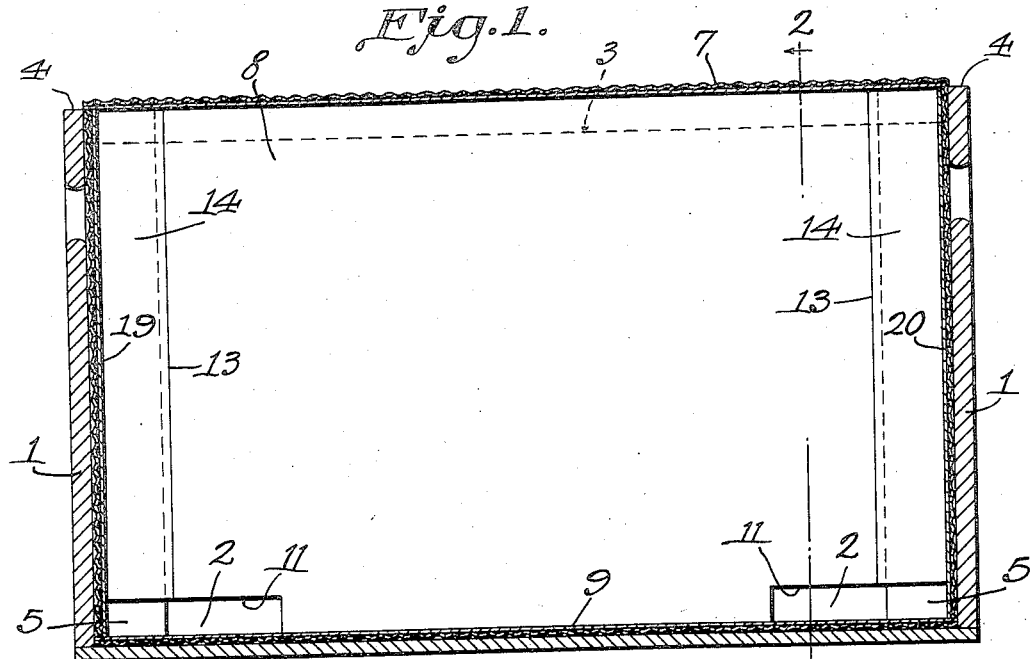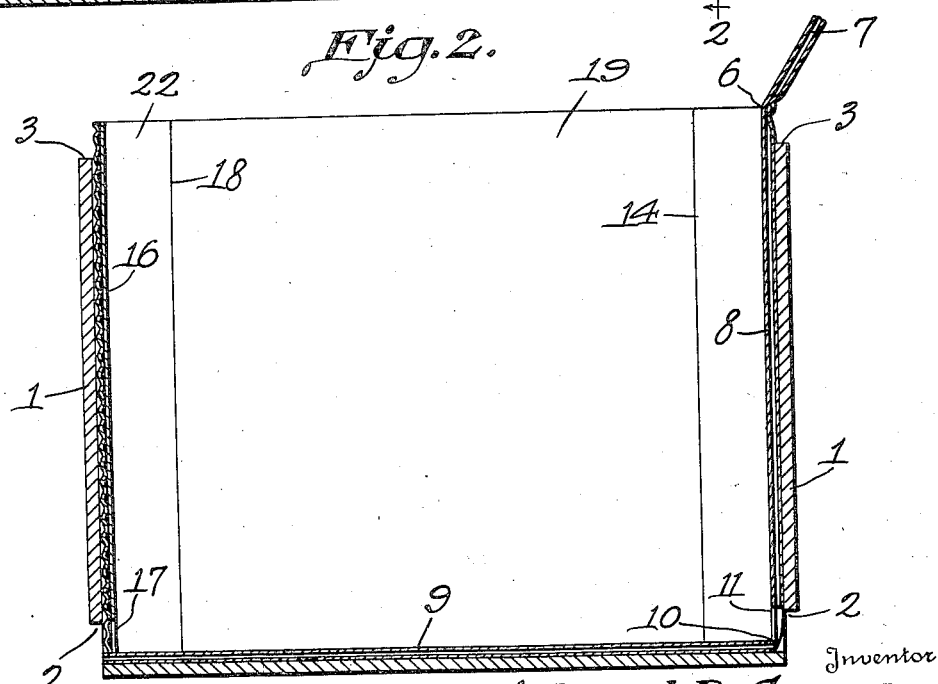

Patented Feb. 25, 1936

2,031,694

UNITED STATES PATENT OFFICE 2,031,694

LINING FOR FRUIT BOXES AND THE LIKE

Richard D. Croce, New York, N. Y.

Application February 26, 1935, Serial No. 8,362

3 Claims. (Cl. 217—3)

This invention relates to a lining designed primarily for use within boxes such as used for shipping or storing apples and other fruits or vegetables.

It is the practice ordinarily to place the fruit in boxes or crates where it either comes into direct contact with the wood of which the container is formed or else contact with a lining of paper or other material which has no cushioning effect. As a result the fruit frequently become bruised and deteriorates rapidly. Realizing the disadvantages of paper linings or the like, attempts have been made to reduce deterioration by the employment of cushions usually placed upon the bottoms of the boxes. However the use of these cushions have only overcome the objections in part and the packet fruit has remained subject to brusing through contact with some of the surfaces of the boxes. Furthermore where paper, pads or the like are employed considerable time is expended in properly placing these parts within a box prior to the packing operation, and the inserted portions have also interfered usually with desirable circulation of air within the packed boxes so essential to carrying away moisture and combatting deterioration.

An object of the present invention is to provide a simple form of lining made up of two pieces which can be quickly inserted into a box and, when in position, will serve as a cushion for protecting the contents of the box from contact with all of the walls, the bottom and the top of the box, the said lining being of a material which will act to sufficiently cushion the fruit so as to reduce bruising to the minimum.

It is also an object of the invention to provide a lining which will not interfere with the free circulation of air within and through the packed box.

A still further object is to provide a lining the two parts of which can be arranged in separate stacks both of which, when conveniently placed, will enable the user to quickly convey the lining members to the box and properly locate them therein.

Another object is to provide a lining made up of corrugated paper board, the members of the lining being scored at proper points so as to facilitate bending of the members into correct shape to properly fit within the box to be packed.

A still further object is to provide a lining one member of which includes a cover lining on which suitable printed matter can be displayed, it being understood that the lining can be faced on one or both sides as preferred and can be suitably colored to meet the requirements of the user, thereby to dispense with the use of colored crepe paper or the like such as commonly used to give an attractive dress to the package.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a vertical longitudinal section through a box provided with a lining such as constitutes the present invention.

Figure 2 is a section on line 2—2, Figure 1, the cover portion of the lining being raised and broken away.

Figure 3 is a perspective view of one of the lining members.

Figure 4 is a plan view of the blank from which it is formed.

Figure 5 is a perspective view of the other lining member.

Figure 6 is a plan view of the blank from which it is formed.

Referring to the figures by characters of reference, I designates a box such as commonly used for shipping or storage purposes, the same being of any suitable size, standard or otherwise. This box is provided along opposed sides at the bottom with openings 2 through which air is designed to enter the box, and the top edges 3 of the sides are preferably located in a plane below the top edges 4 of the ends of the box. The corner portions of the box can be reinforced by vertical triangular corner cleats or strips 5 such as commonly employed. The construction of the box constitutes no part of the present invention but the box can be of the usual or any preferred design.

The lining constituting the present invention is formed of two pieces of corrugated paper board indicated at A and B respectively. Each of these lining members is preferably faced on one side so as to present a smooth inner surface to the packed fruit when the lining is in position while the opposed or corrugated surface will contact with the adjacent surface of the box I. The member A is cut from a single blank being divided by a transverse score line 6 into a top portion 7 and a back wall portion 8. A bottom portion 9 is divided from the back portion 8 by a transverse score 10. Opposed alining slots 11 are extended into the blank from opposite edges thereof and those walls of each slot nearest the bottom portion 9 are connected by the score 10.

Slits or incisions 12 are extended into opposed edges of the blank in line with the score 6 and scores 13 extend from the inner end portions of these slits to the slots 11 along lines parallel with the side edges of the blank. Thus the slots 11, slits 12 and scores 13 cooperate to define side flaps 14.

The bottom portion 9 of the blank is shaped to fit snugly upon the bottom of the box, its corners being cut away as shown at 15 so as to fit properly against the corner cleats or strips 5 heretofore referred to.

The other member of the lining is formed of a single blank of corrugated paper board faced on one side and which has been shown in Figure 6. This blank includes a central or front portion 16 one edge of which is cut away to form a longitudinal recess 17. A pair of scores 18 separate the front portion 16 from one side portion 19 formed by one end of the blank and the other side portion 20 formed by the other end of the blank is also separated from the front portion 16 by parallel scores 21. The cores of each pair are spaced apart to form intermediate corner strips 22.

In practice it is intended to supply the lining members in two separate groups, the members A being arranged in superposed relation to form one stack while the members B are arranged in superposed relation to form another stack.

When it is desired to line a box one of the members A is picked up and bent along the score lines 6, 10 and 13 so as to shape the blank as shown in Figure 3. This member is then inserted in the box with the part 9 resting on the bottom and the part 8 bearing against the back wall with flaps 14 lapping two of the corner cleats. The other member B is then folded along the scores 18 and 21 to shape the blank as shown in Figure 5 whereupon said member is inserted downwardly within the box with the portion 16 bearing outwardly against the front wall, portions 19 and 20 bearing outwardly against the end walls, and intermediate portions 22 bearing against the adjacent corner cleats. When the two blanks are properly proportioned for use in the box the end edges of the blank B will fit against the vertical edges of the flaps 14 while the bottom edges of blank B will fit snugly against the corresponding edges of the portion 9. The recess 17 will register with one of the spaces 2 while the slots 11 will register with the opposed space 2. Thus air can flow readily into the box as well as along the outer corrugated surfaces of the two lining members.

Following the insertion of the lining members the fruit is packed tightly in the box and instead of coming into direct contact with the walls and the bottom of the box it will come against the smooth inner faces of the lining while at the same time the outer corrugated portions will act as cushions for the fruit and prevent it from becoming bruised as a result of pressure and sweating. Consequently the shrinkage or loss due to decay, better known as rot, will be greatly reduced.

Following the packing of the fruit the cover portion 7 is folded downwardly on the contents of the box and the box can then be closed by means of the usual wooden cover or slats or the like commonly employed. As this wooden cover constitutes no part of the present invention but is in common use, it has not been deemed necessary to illustrate or describe it.

Importance is attached to the fact that the lining, because of its peculiar two piece construction, can be inserted very quickly, thereby saving considerable time which is of vast importance to growers or shippers, particularly where large quantities are handled. As the members of the lining are formed of corrugated paper board faced on one side, it is possible to have a part of all of the facing colored so as to improve the dress of the package by increasing its attractiveness.

The outer corrugations permit air to flow freely between the lining and the surfaces of the box so as to carry away any moisture picked up at the point of contact between the fruit and lining, while air entering the box through the openings 11 and 17 can circulate among the fruit and carry away any moisture which might otherwise be trapped therebetween.

As the lining affords an excellent cushion for the fruit the skins of the fruits will not become torn or bruised and consequently the fruit will be delivered to the customer in much better condition than heretofore.

The linings are to be made to fit standard sizes of boxes although it is to be understood that special sizes can be made for boxes of special shapes or capacities.

What is claimed is:

1. A lining for fruit boxes or the like comprising a member of corrugated paper board scored transversely and bendable along its scores to fit the inner faces of three walls of the box and the corner portions defined thereby, a second scored member of corrugated paper board bendable along the scores to provide a portion for fitting snugly on the bottom of the box, a portion for fitting against one wall and the adjacent corner portions of the box, and a portion constituting a cover.

2. A lining for fruit boxes or the like comprising a member of corrugated paper board scored transversely and bendable along its scores to fit the inner faces of three walls of the box and the corner portions defined thereby, a second scored member of corrugated paper board bendable along the scores to provide a portion for fitting snugly on the bottom of the box, a portion for fitting against one wall and the adjacent corner portions of the box, and a portion constituting a cover, one wall portion of each member being cut away at its lower edge to provide air intakes.

3. A lining for fruit boxes or the like comprising a member of corrugated paper board scored transversely and bendable along its scores to fit the inner faces of three walls of the box and having intermediate oblique corner strips, a second scored member of corrugated paper board bendable along the scores to provide a portion for fitting snugly on the bottom of the box, a middle portion for fitting against one wall and the adjacent corner portions of the box, and a portion constituting a cover, one wall portion of each member being cut away at its lower edge to provide air intakes, and side flaps carried by said middle portion and constituting self-adjusting corner portions.

RICHARD D. CROCE.